Feb. 28, 1956 S. DOMESHEK 2,736,230
PHOTOGRAPHIC RECTIFIERS
Filed July 20, 1953 3 Sheets-Sheet 1
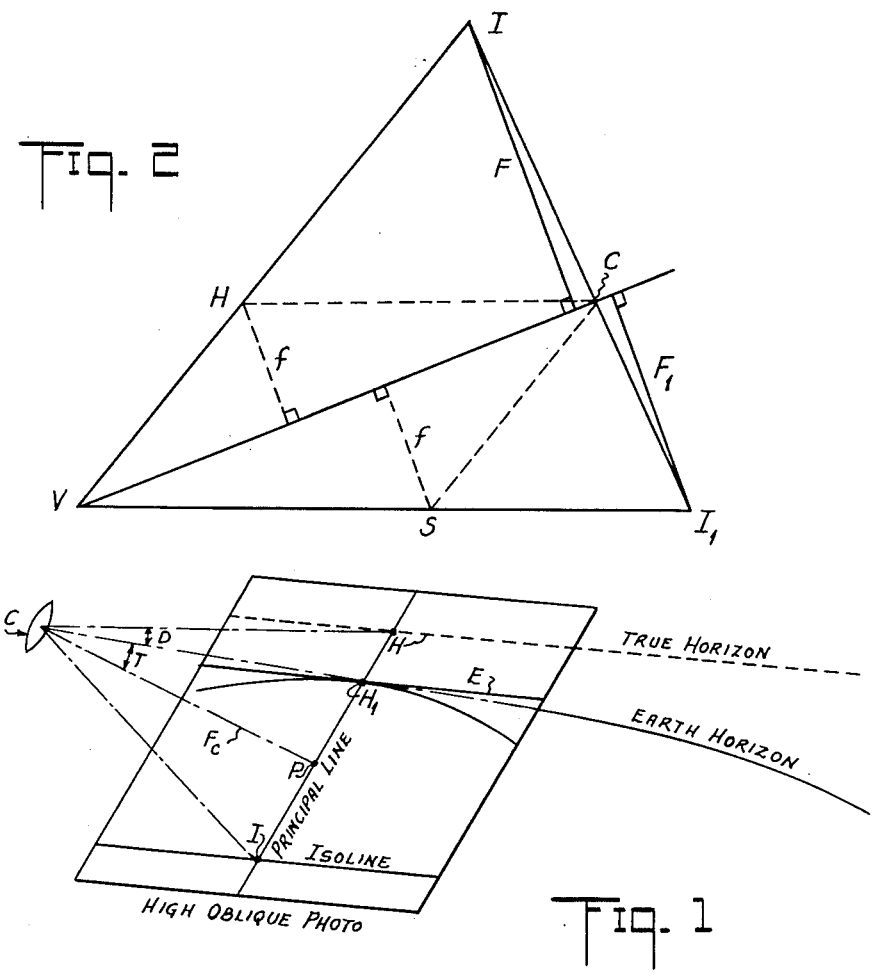
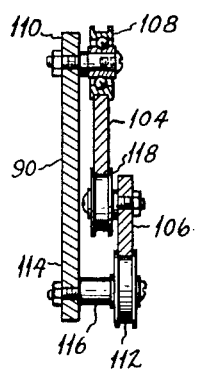
INVENTOR.
SOL DOMESHEK
BY
Roderick H. Jones
ATTORNEYS

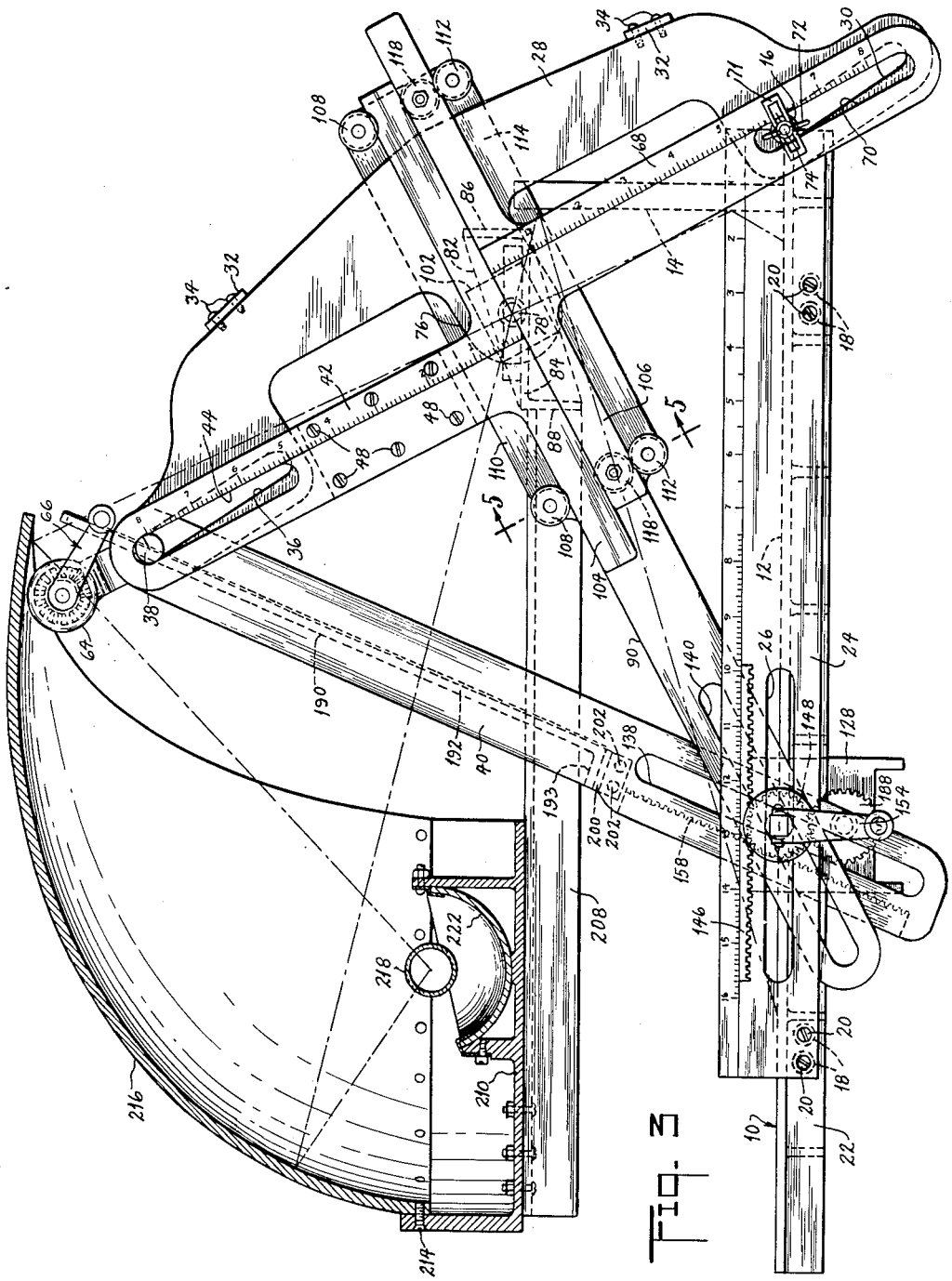

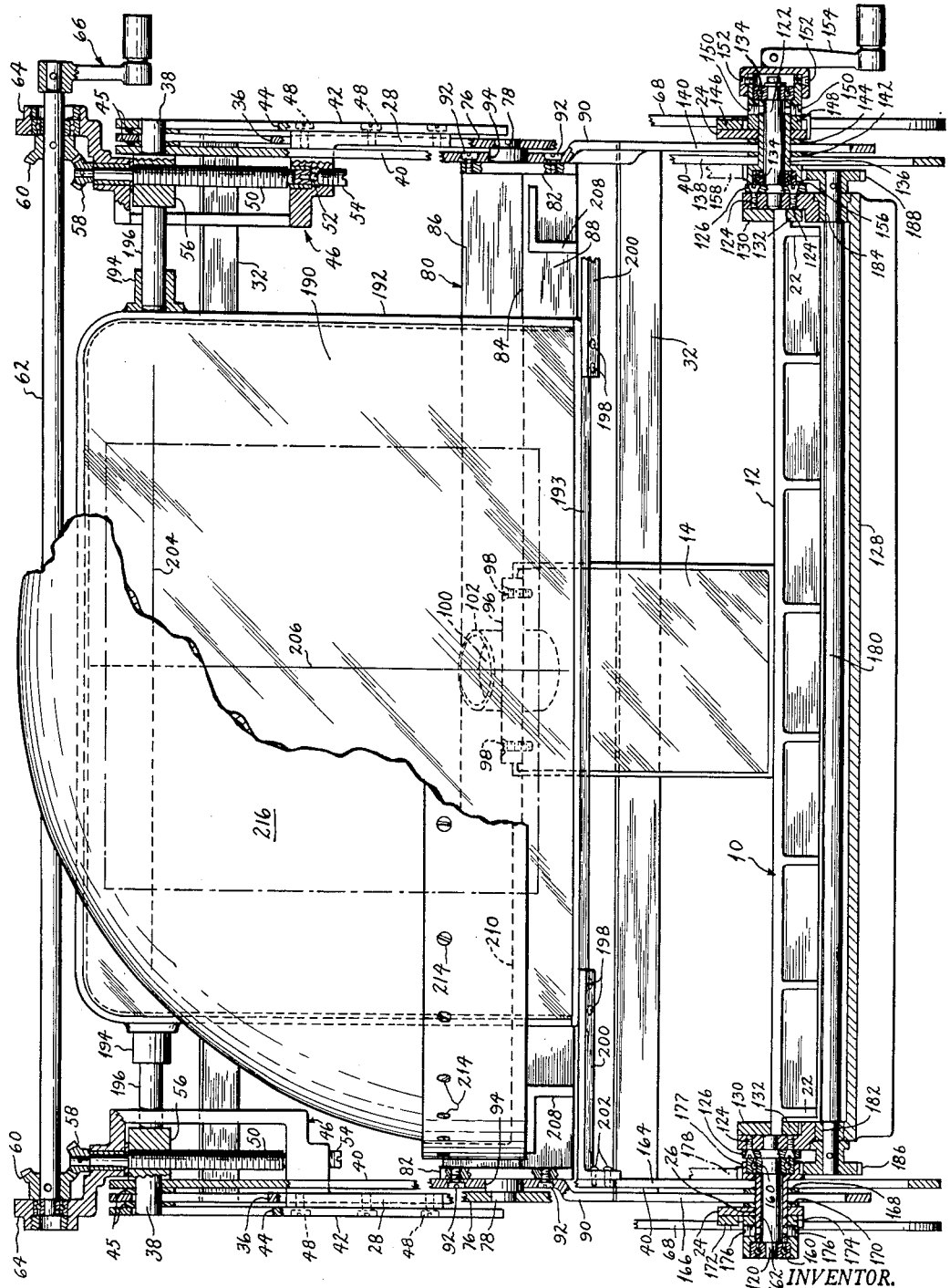

United States Patent Office 2,736,230
Patented Feb. 28, 1956

2,736,230

PHOTOGRAPHIC RECTIFIERS

Sol Domeshek, Great Neck, N. Y.

Application July 20, 1953, Serial No. 369,262

10 Claims. (Cl. 88—24)

(Granted under Title 35, U. S. Code (1952), sec. 266)

The invention described herein may be manufactured and used by or for the Government of the United States of America for governmental purposes without the payment of any royalties thereon or therefor.

This invention relates to photographic rectifiers, and more particularly pertains to apparatus for rectifying high-oblique aerial photographs into the equivalent vertical views. Such apparatus is useful in producing large scale topographic maps and mosaics from a plurality of overlapping high-oblique aerial photographs.

The principal object of the invention is to provide a device for rectifying aerial photographs simply and directly, without the necessity of additional ratio printing of the oblique negative or of the rectified print.

Another object is to provide a device of the character described incorporating automatic means for distributing light evenly over the entire surface of the print, thereby improving the quality thereof.

Another object is to provide a photo rectifier of the character described that is small in size and correspondingly light in weight, and that can be set for operation with a minimum of computations and adjustments.

Other objects and many of the attendant advantages of this invention will readily be appreciated as the same becomes better understood by reference to the following detailed description when considered in connection with the accompanying drawings wherein:

Fig. 1 is a schematic representation of a high-oblique photograph at its position of exposure relative the earth, and illustrates the construction of the principal line, the isoline, the true horizon and the vanishing point on the photograph;

Fig. 2 is a side elevational schematic diagram of the oblique rectifier illustrating the geometric basis for the operation thereof;

Fig. 3 is a side elevational view of a high-oblique rectifier, showing a preferred embodiment of the invention;

Fig. 4 is a front elevational view thereof, with sections broken away; and

Fig. 5 is a section taken on the line 5—5 of Fig. 3.

Similar numerals and reference characters refer to similar parts throughout the several views.

Fig. 1 illustrates a typical high-oblique photograph, such as might have been taken from an aircraft, the photograph being shown, in relation to the earth and the camera lens, at its position of exposure. By definition, it is simply a photograph in which an image of the earth's horizon appears, or, technically, one in which the optical axis of the camera, CP, is inclined less than 45° from the horizontal.

The camera lens C is arranged so that its optical axis CP is perpendicular to the plane of the photographic film, and the point P, where this axis pierces the photograph, is called the principal point. The photographic film preferably is provided with reference marks in the center of each edge arranged so that the intersection of the lines joining these marks automatically locates the principal point.

As noted above, the earth's horizon appears on the high-oblique photograph as a rather flat curve. A tangent E drawn at a point on the curve closest to the principal point helps provide the basic information for the orientation of the photograph in the oblique rectifier herein disclosed. Thus, firstly, the tangent line E is parallel to the ground or map plane. Secondly, the perpendicular to this tangent line through the principal point P, called the principal line, indicates the azimuth in which the camera was directed or "looking" along the ground. Thirdly, the distance along the principal line from the principal point to the tangent line divided by the focal length $F_c$ of the camera (the distance from the lens C to the film), is the tangent of the angle of depression, T, of the optical axis CP from the earth's horizon. Therefore, knowing the distance of the horizon from the photo center, $PH_1$, which can be measured directly on the photograph, and the focal length $F_c$ of the camera, the angle T can readily be calculated. Preferably, a table is prepared in advance, giving the angles T for various distances $PH_1$, so that the particular angle T for any photograph taken by a camera of given focal length can be read directly.

Since the earth's horizon is lower than the true horizon, a correction must be applied to the angle T, determined above, in order to locate the trace of the true horizon on the photograph. Graphs and tables giving this correction, usually termed the dip angle, D, for any given height above the earth's surface, are known. The total angle of depression of the camera axis from the horizontal, then, will be the sum of the angles T and D.

Knowing the total angle of depression, T plus D, and the focal length $F_c$, the distance IH can readily be calculated, it being equal to the focal length of the camera divided by the cosine of the total angle of depression.

A line through the isopoint I and perpendicular to the principal line is called the isoline, and is the basic scale line of the high-oblique photograph, for along it the scale of the photograph is the same as would be the scale of a vertical photograph taken with the same lens at the same height.

As hereinbelow described, the high-oblique photo negative is oriented on the object plate of the high-oblique rectifier with its principal line and isoline in register with a corresponding principal line and isoline scribed on the object plate, at which position a rectified image will be cast on the photographic print paper on the image plate at the particular magnification desired, depending upon the setting of the instrument.

Fig. 2 illustrates schematically the geometry of the rectifier from which an understanding of its operation and the mathematical basis therefor can be had. In Fig. 2:

$f$=the focal length of the rectifier lens;

$C$=the position of the rectifier lens;

$VC$=the trace of the principal plane of the lens, occupied by the link VC;

$VI$=the trace of the object plane, occupied by the link VI;

$HI$=the orientation of the negative on the object plate;

$VI_1$=the trace of the image plane, occupied by the link $VI_1$;

$H$=the true horizon on the oblique negative to be rectified;

$I$=the isopoint on the oblique negative, and is the reference point in the system of rectification;

$I_1$=the isopoint on the rectified photograph, and serves as an auxiliary reference point; and $II_1$=the link between the isopoints I and $I_1$.

The relationships defined establish that $HC=VS$ each being the hypotenuse of similar triangles.

The mechanical structure, hereinbelow fully described, is such that:

Links II₁ and VI pivot about point I;
Links F₁ and VI₁ pivot about point I₁;
Points I and I₁ move in slots in link II₁, link F and link F₁;
Link VC pivots about point C;
Point C is fixed on link II₁; and
Link VC moves freely through point V. Then:

$$M = \frac{CI_1}{IC} \qquad (1)$$

where M is the magnification of the rectified print at the isoline.

From similar triangles, $$M = \frac{VH}{HI} = \frac{SI_1}{VS} \qquad (2)$$

Also, from similar triangles, $$F = \frac{VI}{VH} f = \left(\frac{VH+HI}{VH}\right) f = \left(1 + \frac{HI}{VH}\right) f \qquad (3)$$

and $$F_1 = \frac{VI_1}{VS} f = \left(\frac{VS+SI_1}{VS}\right) f = \left(1 + \frac{SI_1}{VS}\right) f \qquad (4)$$

therefore, substituting Equation 2, $$F = \frac{(M+1)}{M} f \text{ and } F_1 = (M+1) f \qquad (5)$$

Thus, the linkages F and F₁ of Fig. 2 are used to adjust the rectifier for the desired magnification over the range, for example, between .75 and 1.25, simply by setting the distances F and F₁ in accordance with the relations (5) above.

The improved rectifier comprises a cross-ribbed base plate 10 having a flat upper surface 12 upon which the rectified image is reflected by a rectangular mirror 14 fixed perpendicular to and extending upwardly of said base plate near one end thereof. Extending outwardly of opposed sides of the base plate 10, slightly behind the mirror 14 and in parallel alignment therewith, are a pair of pivot pins 16 (Fig. 3, only one shown), the common longitudinal axis of which lies in the plane occupying the flat upper surface 12 of said base plate. Fixed against the sides of the base plate 10 and spaced therefrom as by spacer sleeves 18 and screws 20 threaded into the outer ribs 22 of said base plate are a pair of side members 24 through one end of which the pivot pins 16 extend. The other ends of the side members 24 are slotted longitudinally, as indicated by the member 26, the longitudinal axes of said slots being in a plane common with that of the flat upper surface 12 of the base plate 10. Carried on each of the pivot pins 16 between the sides of the base plate 10 and the side members 24 are a pair of yoke members 28, said yoke members being provided with slots 30 in their lower portion through which said pins pass and with respect to which said yoke members can be rotatably and slidably adjusted. The yoke members 28 are interconnected rigidly for motion in unison by means of the elongated, rectangular bridge members 32 fixed against the back edges of said yoke members by screws 34. The upper end portions of the yoke members 28 are provided with slots 36 having their longitudinal axes parallel with respect to, but slightly displaced from, the longitudinal axes of the lower slots 30. Slidably carried in the slots 36 are a pair of aligned upper pivot pins 38. The pivot pins 38 also carry the upper ends of a pair of object plate link members 40, mounted rotatably thereon, and a pair of F arms 42 in slots 44 thereof. The upper end portions of the yoke member 28 are disposed between the link members 40 and the F arms 42, the F arms being at the outer ends of the pivot pins 38, and said members and arms being spaced from one another by spacers 45.

Means is provided to adjust in unison the positions of the pivot pins 38 with respect to the F arms 42 in the slots 44 thereof, said means comprising housings 46 having their lower portions fixed against the inner surfaces of the F arms 42 by screws 48. Journalled rotatably in said housings are a pair of lead screws 50 aligned with and substantially coextensive with the slots 44 of the F arms 42. The lower ends of the lead screws 50 are constrained against longitudinal motion by means of a thrust bearing comprising the ball bearing 52 and the set screw 54.

The upper pivot pins 38 are each integral with internally threaded follower members 56 riding on the lead screws 50 whereby rotation of said lead screws moves the pivot pins 38 up or down within the slots 36 and 44. The upper ends of the lead screws 50 extend out of the housings 46 and are provided with bevel gears 58 cooperative with level gears 60 fixed on a cross-rod 62 journalled in upwardly-extending portions 64 of the housings 46. One end of the cross-rod 62 is provided with a handcrank 66, whereby the lead screws 50 can be rotated in unison to simultaneously adjust the position of the upper pivot pins 38 with respect to the F arms 42.

The pivot pins 16, in the base plate 10, besides carrying the slotted lower end portions of the yokes 28, also carry a pair of F₁ arms 68 along slots 70 therein. The positions of the lower end of the yokes 28 and the F₁ arms 68 with respect to the pivot pins 16 are fixed after magnification adjustment (as hereinbelow described in connection with the description of operation of the instrument), by means of individual apertured clamp bars 71 tightened under wing nuts 72 threaded upon studs 74 extending outwardly of said pivot pins. It is to be understood, however, that a mechanism similar to that shown and described for controlling the positions of the upper pivot pins 38 could also be used for simultaneously adjusting the position of the yokes 28 and the F₁ arms 68 with respect to the pivot pins 16.

The yoke members 28 are each provided with a centrally located, inwardly extending ear portion 76, centrally apertured to receive rotatably therein the pivot studs 78 of a lens-carrying member 80 positioned between said yoke members. The lens-carrying member 80 comprises a pair of end plates 82, each in the shape of a parallelogram, to which the pivot studs 78 are affixed and between which is rigidly connected an angle iron crosspiece 84 having oppositely ending longitudinal end sections 86 and 88. The end plates 82 of the lens-carrying member 80 are each fixed to a lens-positioning arm 90 by screws 92, the pivot stud 78 of said lens-carrying member extending through aperture 94 in said arms. Centrally located within the crosspiece 84 is a lens mount block 96, fixed thereupon by screws 98. The crosspiece 84 and the lens mount block 96 are apertured to receive therein a wide-angle lens 100 mounted in a cylindrical holder 102. The lens is positioned so that its optical center is in the plane containing the common axes of the pivot pins 16 and the pivot pins 38, and so that it lies centrally within the plane defined by the longitudinal axes of the lens-positioning arms 90, which axes pass through the axis common to the pivot studs 78.

The lower ends of the F arms 42 are each integrally formed with a right-angular crossbar 104 and the upper ends of the F₁ arms 68 are each integrally formed with a similar right angular crossbar 106. A system of guide wheels is provided for maintaining the outer edges of the crossbars 104 and the crossbars 106 in register with each other and in register with the longitudinal axes of the lens-positioning arms 90 (see Figs. 3 and 5), said system comprising pairs of flanged ball-bearing roller wheels 108 secured in spaced relation along upper widened portions 110 of the lens-positioning arms 90, for guiding the upper edges of the right angular crossbars 104, and pairs of flanged ball-bearing roller wheels 112 secured in spaced relation along lower widened portions 114 of said lens-positioning arm for guiding the lower edges of the right-angular crossbars 106. Since the F arms 42 are not in vertical alignment with their respective $F_1$ arms 68, spacers 116 are used to hold the roller wheels 112 in proper off-set relation for guiding the right angular crossbars 106. In order to hold the F arms 42 and the $F_1$ arms 68 slidably fixed in right-angular relation to one another, the undersides of the crossbars 106 have fixed therealong in spaced relation pairs of flanged ball-bearing roller wheels 118 engaging the outer edges of the crossbars 104, whereby said outer edges and the outer edges of the crossbars 106 will always be maintained in register with each other and with the longitudinal axes of the lens-positioning arms 90, no matter what magnification or what the degree of obliquity in a photo negative for rectification of which the instrument is set.

Movable laterally within the slots 26 of the side members 24 are a pair of aligned left- and right-hand pivot pins 120 and 122, respectively, fixed by screws 124 through flange portions 126 thereof against the outer sides of a U-shaped carriage member 128, the inner sides of which bear slidably against upper and lower slide bars 130 and 132, respectively, the face of said member 128 being positioned flush with the side edges of the base plate 10.

The right-hand pivot pin 122 has rotatably mounted thereon, on ball bearings 134 at each end thereof, a sleeve 136. The lower end of the right hand object plate link member 40 is provided with an axial slot 138, through which the sleeve 136 extends. The lower end of the right hand lens-positioning arm 90 is similarly provided with a slot 140 riding on the sleeve 136, said lens-positioning arm being spaced from the object plate link member 40 by a spacer 142, circumjacent said sleeve. Another spacer 144 separates the lens-positioning arm 90 from the side member 24. There is mounted on the outer side of the side member 24 above the slot 26 thereof a rack 146 cooperative with a gear member 148 fixed to the sleeve 136 by a pair of set screws 150. Fixed to the outer end of the gear member 148 by screws 152 is a hand-crank 154. A second gear member 156 is fixed to the sleeve 136 at the inner end thereof, said gear being cooperative with a rack 158 fixed along the inner side of the object plate link member 40 above the slot 138 therein.

The left-hand pivot pin 122 has rotatably mounted thereon, on ball bearings 160 at each end thereof, a sleeve 162. The lower end of the left-hand object plate link member 40 is provided with an axial slot 164, through which the sleeve 162 extends. The lower end of the left-hand lens-positioning arm 90 is similarly provided with a slot 166, riding on the sleeve 162, said lens-positioning arm being spaced from the object plate link member 40 by a spacer 168 circumjacent said sleeve. Another spacer 170 separates the lens-positioning arm 90 from the left-hand side member 24. There is mounted on the outer side of the left-hand side member 24 above the slot 26 thereof a rack 172 cooperative with a gear member 174 fixed to the sleeve 162 by a pair of set screws 176. A second gear member 177 is fixed to the sleeve 162 at the inner end thereof, said gear being cooperative with a rack 178 fixed along the inner side of the left-hand object plate link member 40 above the slot 164 therein.

A shaft 180 journalled in aligned sleeve bearings 182 and 184 fixed in the sides of the U-shaped carriage member 128 carries at its left-hand end a gear 186 and at its right-hand end a gear 188 cooperative, respectively, with the gear members 177 and 156, whereby the pivot pins 120 and 124 are moved laterally in unison in their slots 26, upon turning of the hand-crank 154. It is furthermore to be noted that the rectifier is constructed so that the distances between the axes of the pivot pins 38 and their respective right- and left-hand pivot pins 120 and 122, and the distances between the axes of the pivot pins 16 and their respective right- and left-hand pivot pins 120 and 122 are all maintained equal by reason of the rack and gear arrangement described above, no matter what the lateral position of the pivot pins 120 and 122 in their respective slots 26.

Secured between the object plate link members 40 for movement in unison therewith is an object plane glass 190 seated in a substantially rectangular flanged frame 192. The upper end of the flanged frame 192 is provided with a pair of opposed socket bearings 194 within which fit pivot pins 196, extending from follower members 56 and integral therewith, said pivot pins being rotatable and coaxial with the pivot pins 38 extending from the other side of said follower members.

The lower end of the flanged frame 192 is provided with an outwardly-extending right angular portion 193 against which is secured, as by screws 198, a pair of opposed brackets 200 secured at their outer ends to the respective object plate link members 40 by screws 202.

The underside of the object plane glass 190 is located to lie in the plane in common with that defined by the parallel axes of the pairs of pivot pins 38 and 120, 122. Scribed on the underside of the object plate glass 190 is an isoline 204 (located along the axis of the pivot pins 38), and a principal line 206, central and right-angular with respect to said isoline.

Exposure light means movable in unison with the projection lens 100 is provided, said means comprising a pair of angle iron bracket members 208 securely fixed at one end to, and extending outwardly substantially horizontally from, the longitudinal end section 88 of the lens-supporting crosspiece 84. Supported upon the outer ends of the bracket members 208 is a substantially semi-circular member 210 having an upwardly-extending flange 212 to which is secured by screws 214 a semi-elliptical reflector hood 216. Within the semi-circular member 210 is mounted a lamp 218 in suitable sockets (not shown), said lamp being provided with a concave reflector 222 for directing all the light upwardly against the inner reflecting surface of the hood 216, from which it is directed in a conical beam through the object plane glass 190 upon the lens 200, filling the entrance pupil thereof. It is to be noted that the elliptical reflector hood 216 acts to cut down the difference in intensities of light impinging on the object plate (the upper surface 12 of the base plate 10), by throwing the greater amount of light into the area of greater obliquity.

Operation of the device in a conventional dark room permits dispensing with light shielding means. In the alternative, the light-sensitive sheet can be shielded by light-sealing the openings between the base plate 10 and hood 216 with suitable bellows permitting movement of the linkages as desired.

*Operation*

The oblique negative (see Fig. 1) is oriented on the underside of the object plate glass 190 by placing its isoline and principal line in coincidence with the isoline 204 and principal line 206 scribed thereon. The hand-crank 154 of the instrument is then turned to set the distance VI (referring to the schematic representation of the instrument, Fig. 2) equal to the photo-distance HI (see Fig. 1), multiplied by M (the magnification desired at isoline).

The distance F and $F_1$ (of the F and $F_1$ arms 42 and 68, respectively in the instrument) are set equal to $$\frac{(M+1)}{M}f$$

and $(M+1)f$, respectively, as hereinabove determined. The F and $F_1$ settings have the effect of automatically adjusting the IC and CI values to satisfy both the magnification and geometrical optics of the problem and of setting the rectifier so that all requirements for precise rectification are fulfilled. Thus, HC becomes parallel to VI, and equal to HI, and the rectifier lens principal plane intersects both the object and image plans.

Obviously many modifications and variations of the present invention are possible in the light of the above teachings. It is therefore to be understood that within the scope of the appended claims the invention may be practiced otherwise than as specifically described.

I claim:

1. A rectifier for high-oblique photographs comprising an object plate adapted to carry a photographic negative, a base plate defining an image plane, said object plate being carried by said base plate rotatably about a first axis parallel to said image plane, an image-forming lens having its optical center on a line perpendicular to said axis and to a second axis in said image plane, said first and second axes being parallel, means to rotate said base plate about said second axis, and means connecting said lens, said object plate and said base plate to maintain intersection of the transverse central plane of said lens containing said optical center, the photographic negative plane defined by said object plate and the image plane defined by said base plate on a common line parallel to and equidistant from said axes, a light source fixed with respect to said lens and an ellipsoidal reflector having its foci at said light source and at the entrance pupil of said lens respectively, and a mirror positioned to fold the optical path through said lens from a point in the object plane to a point in said image plane so that both of said points lie on the same side of the plane defined by said axes.

2. In a rectifier for aerial photographs, an object plate comprising a plane surface to support an aerial photograph, a base plate comprising a plane surface to support a receptor sensitized to receive an image, a light source, a light-directing device to direct light from the source in a predetermined path to the surface of the object plate and therebeyond to the surface of the base plate, a lens in the light path from the object plate to the base plate and focused to project an image at the plane of the object-plate surface to the plane of the base-plate surface, and adjusting mechanism operable to compensate for obliquity in an aerial photograph at the object-plate surface in the projected reproduction thereof at the base-plate surface, the adjusting mechanism comprising a pivot common to the object and base plates on an axis in parallel relationship with the planes of both their surfaces for rotating the several plates relative to each other to different angles of relative displacement selectively, a yoke comprising an attachment securing the yoke at each of its opposite ends to the object and base plates respectively to hold them in selected positions of angular displacement, the adjusting mechanism being operable to move the attachment at one end at least of the yoke in a direction lengthwise of the yoke and according to the selected angular displacement between the object and base plates.

3. In a rectifier as defined in claim 2, the adjusting mechanism being operable to move the attachment at the other end also of the yoke in a direction lengthwise of the yoke.

4. In a rectifier as defined in claim 3, one attachment comprising a yoke pivot secured to the object plate, the other attachment comprising a yoke pivot secured to the base plate, the several yoke pivots comprising axes parallel to each other and to the plane of both surfaces of the object and base plates, each attachment comprising a slot at its corresponding end of the yoke to contain its corresponding yoke pivot, the several slots being disposed lengthwise of the yoke for movement of the yoke pivots towards and away from each other to swing the object and base plates relative to each other on the axis of their common pivot.

5. In a rectifier as defined in claim 4, the object plate and the base plate each comprising a slot extending in the plane of its surface and containing the common pivot to adjust the position of its axis for its selected location in the planes of the several plates.

6. In a rectifier as defined in claim 5, an arm extending to the common pivot from the yoke, the yoke comprising a pivot for the arm at a point between its end pivots of the several object and base plates and on an axis parallel therewith, the arm comprising a lengthwise slot containing the common pivot, measuring devices for linear displacements carried by the yoke and yoke-supported arm and indicating linear displacements of the common pivot along the slots of the several object and base plates and linear displacements of the end pivots of the yoke along their respective slots of the yoke according to the obliquity of the aerial photograph in conformance with required rectification at the surface of the base plate.

7. In a rectifier as defined in claim 6, the measuring device comprising companion straight edges travelling relative to each other along a line through the common pivot and the pivot of the yoke-supporting arm in response to adjustment of the several common pivot and yoke pivots of the object and base plates and in accordance with correct rectification for the obliquity of the aerial photograph as determined trigonometrically.

8. In a rectifier as defined in claim 6, the lens being secured to the yoke-supported arm for adjustment of its position in accordance with the location of the light path from the object plate to the base plate and in response to adjustments changing position of the arm.

9. In a rectifier as defined in claim 5, an arm extending from the yoke to the common pivot, the yoke comprising a pivot for the arm at a point between its end pivots of the several object and base plates and on an axis parallel therewith, the lens being secured to the yoke-supporting arm for adjustment of its position in accordance with the location of the light path from the object plate to the base plate and in response to adjustments changing position of the arm.

10. In a rectifier as defined in claim 2, the light-directing device comprising a reflector positioned to reflect light from the source to the object plate, the reflector being contoured to direct light from the source to the surface of the object plate distributed over the area thereof with a density gradient that is rectified to uniform density of light distribution over the surface of the base plate.

References Cited in the file of this patent

UNITED STATES PATENTS

| | | |
|---|---|---|
| 1,612,800 | Brock | Jan. 4, 1927 |
| 1,910,425 | Cahill | May 23, 1933 |
| 2,239,760 | Simmon | Apr. 29, 1941 |